United States Patent Office 3,258,417
Patented June 28, 1966

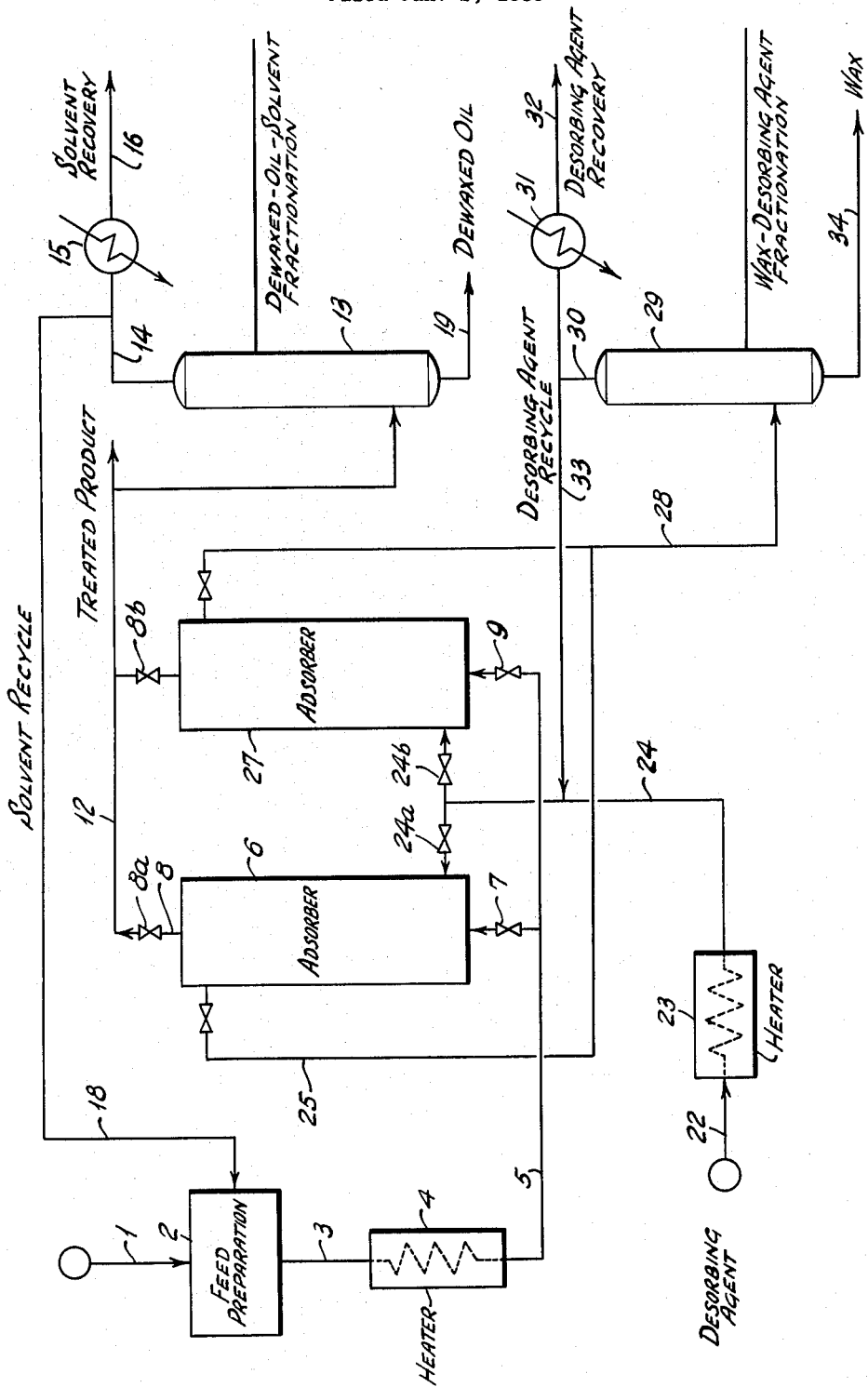

3,258,417
DEWAXING BY CONTACT WITH A MOLECULAR SIEVE ADSORBENT
Howard V. Hess, Glenham, Edward R. Christensen, Wappingers Falls, and Edwin R. Kerr, Fishkill, N.Y., assignors to Texaco Inc., a corporation of Delaware
Filed Jan. 2, 1959, Ser. No. 784,685
11 Claims. (Cl. 208—26)

This application is a continuation-in-part of our co-pending patent application Serial No. 534,298 filed September 14, 1955, now abandoned.

This invention relates to a process for the separation of wax from wax-oil mixtures, and is particularly concerned with a process for dewaxing hydrocarbon fractions containing crystalline and/or micro-crystalline wax. More specifically, the present invention has to do with an adsorption separation process wherein wax is adsorbed by a particle-form adsorbent followed by separation of the wax-bearing adsorbent from the treated oil.

Petroleum distillates, particularly the relatively heavy distillates, are employed as lubricants for many applications. A most important property of a mineral oil for application as a lubricant is its viscosity. The viscosity of the mineral lubricating oil must be such as to maintain an oil film on the surface to be lubricated without materially increasing resistance to movement of the lubricated parts.

Waxes occur as natural constituents of petroleum and petroleum distillates. Waxes may be considered plastic or semi-solid bodies at ordinary temperatures which become solids at subnormal temperatures. When waxes are associated with lubricating oil, they seriously affect the viscosity of such oils. This is particularly true when the lubricating oil is subjected to relatively low temperatures under which conditions the solidified wax thickens the oil and destroys its fluidity. Removal of all wax from oils intended for lubricant application is, therefore, highly desirable.

Waxes have been removed from mineral oils by various filtration and extraction methods. An early method, known as cold settling, consisted of chilling the oil until the wax component solidified and settled out followed by drawing off the relatively wax-free supernatant oil. Because this method was highly inefficient, due to high oil losses and the excessive time required to effect the wax-oil separation, more effective wax separation and filtration processes were developed. Dewaxing processes involving wax-filtration, however, suffer the disadvantage that the separated wax tends to block the filtering surface at dewaxing temperatures. Conventional dewaxing processes have another serious disadvantage. Since such processes depend on crystallization or precipitation of the wax in order to effect separation, they require considerable costly refrigeration to treat the wax-oil mixture.

A method for the removal of wax and wax-forming constituents from wax-containing oils, which obviates the need for any refrigeration in a wax removal process and overcomes other disadvantages of wax filtration processes, has now been discovered.

A principal object of this invention is to provide an improved method for the removal of wax and wax-forming constituents from oils, natural or synthetic. Another object is to provide a method for the separation of waxy straight chain hydrocarbons from associated mineral lubricating oils. A further object is to provide a wax separation process that obviates the need for refrigeration or for wax crystallization and precipitation in order to effect the removal of wax. How these and other objects are accomplished will become apparent in the light of the accompanying description and drawing which schematically illustrates an embodiment of the practice of this invention as applied to the dewaxing of a waxy mineral oil fraction.

In accordance with the present invention, a waxy oil is contacted with a solid selective adsorbent which adsorbs waxy straight chain hydrocarbons within the pores of the adsorbent, such as waxy straight chain hydrocarbons containing from 18 to 30 carbon atoms or more per molecule, to adsorb waxy straight chain hydrocarbons from said oil, followed by a separation of the wax-bearing adsorbent and recovery of the treated oil.

In one embodiment of this invention, the viscosity of the waxy oil is reduced before it is contacted with the solid selective adsorbent. This may be accomplished by diluting the mineral oil with a light organic or petroleum solvent or diluent, such as naphtha or the like. It is particularly desirable that this solvent or diluent be of such a nature that it cannot be adsorbed within the pores of the solvent adsorbent. This condition will be satisfied if the solvent or diluent employed has a critical or effective molecular diameter in excess of about 5 Angstrom Units, that is, comprises predominantly non-straight chain hydrocarbons and/or organic compounds of similar molecular configuration. Suitable solvents which are not adsorbed within the pores of the adsorbent are the aromatic, naphthenic and iso-paraffinic hydrocarbons, and others. Examples of such solvents include benzene, toluene, cyclohexane, cyclohexanol, iso-butane, iso-pentane and the like. Another way to reduce the viscosity of the mineral oil to be dewaxed is to heat the oil to an elevated temperature, i.e. about 140°–700° F., during contact with the solid adsorbent.

In still another embodiment of the practice of this invention particularly applicable to the dewaxing of mineral oil, either in the liquid phase or in the vapor phase, the adsorbent prior to contact with the waxy hydrocarbons is subjected to a subatmospheric pressure or vacuum, such as a pressure below about 250 mm. Hg absolute, for a period of time sufficient to empty the pores thereof. During this vacuum pretreatment operation it is desirable to maintain the adsorbent at a relatively elevated temperature, such as a temperature above about 200° F., e.g., above about 500° F., desirably at the same temperature to which the subsequent contacting and selective adsorption of the waxy hydrocarbons is to be effected. Depending upon the temperature and/or subatmospheric pressure employed and/or the materials to be emptied from the pores of the adsorbent the pretreatment time period satisfactory to effect emptying of the pores will vary. In general, higher pretreatment temperatures and lower subatmospheric pressures, and combinations thereof, speed up the emptying of the pores of the adsorbent by removing any adsorbed material therefrom thereby increasing the rate of adsorption of the waxy straight chain hydrocarbons in the subsequent adsorption operation. Vacuum pretreatment in the range 5 seconds to 2 hours, more or less, are suitable, such as a vacuum pretreatment time in the range 0.5–15 minutes.

The invention is adapted to the dewaxing of mineral oils and various petroleum fractions, such as diesel oils, gas oil, refrigerator oil, jet fuel, light and heavy lube oils and various petroleum fractions, such as diesel oils, carbons. A typical petroleum fraction suitable for use in the process of the invention might have an initial boiling point in the range 500–600° F. and an end point in the range 750–1050° F., more or less. Furthermore, such a fraction might contain 0.1 to 5% by weight of waxy straight chain hydrocarbons.

Any solid adsorbent which selectively adsorbs straight chain hydrocarbons within its pores can be employed in the practice of this invention. It is preferred, however, to employ as the adsorbent certain natural or synthetic zeolites or alumino-silicates, such as a calcium aluminosilicate, which exhibits the property of a molecular sieve, i.e., an inorganic material or alumino-silicate made up of porous crystals wherein the pores of the crystals are of molecular dimension and are of uniform size. A particularly suitable solid adsorbent is a calcium alumino-silicate manufactured by Linde Air Products Company and designated Linde Type 5A Molecular Sieve. Crystals of this particular calcium alumino-silicate, apparently actually a sodium calcium alumino-silicate, have a pore size of about 5 Angstrom Units, a pore size sufficient to admit straight chain hydrocarbons to the substantial exclusion of non-straight chain hydrocarbons, such as the naphthenic, iso-paraffinic, iso-olefinic, and aromatic hydrocarbons.

Other solid selective adsorbents may be employed in the practice of the invention. For example, it is contemplated that solid selective adsorbents having the property of selectively adsorbing straight chain hydrocarbons within their pores to the substantial exclusion of non-straight chain hydrocarbons in the manner of a molecular sieve may be obtained by suitable treatment of various oxide gels, especially metal oxide gels of the polyvalent amphoteric metal oxides.

Other suitable solid selective adsorbents are known and include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons. The naturally occurring zeolite chabasite exhibits such desirable properties. Another suitable naturally occurring zeolite is analcite, $NaAlSi_2O_6 \cdot H_2O$, which, when dehydrated, and when all or part of the sodium is replaced by calcium, yields a material which may be represented by the formula,

$$(Ca, Na_2)Al_2Si_4O_{12} \cdot 2H_2O$$

and which, after suitable conditioning, will adsorb straight chain hydrocarbons within its pores to the substantial exclusion of non-straight chain hydrocarbons. Naturally occurring or synthetically formed phacolite, gmelinite, harmotone and the like, or suitable modifications of these, produced by basic exchange, are also operable.

Contact of the waxy oil with the adsorbent may be made in the liquid or vapor phase under a wide range of temperatures and pressures. The residence time of the mineral oil fraction with the adsorbent should be sufficient to assure adsorption of substantially all of the straight chain hydrocarbons from the oil. As a general rule, adsorption will be accomplished more quickly under conditions of higher temperature.

Liquid phase contacting and adsorption of the straight chain hydrocarbons may advantageously be conducted under atmospheric pressure and at temperatures between 140 to 500° F., more or less. In the liquid phase, contact of the oil and the adsorbent may be effected in an open vessel containing the adsorbent. Accordingly, a slurry of the oil and adsorbent is formed in a vessel and a suitable means of agitation employed to assure adequate mixing. Following adsorption of the straight chain hydrocarbons, the treated oil is separated from the adsorbent by any of the well known separation methods, such as decanting, siphoning, centrifugation or filtering. Liquid phase contacting may also be accomplished by passing the oil through a packed column of the adsorbent, as by percolation.

Vapor phase contact of the oil and adsorbent is accomplished by heating the oil to effect vaporization followed by passing the oil vapor through a column or tower packed with the adsorbent. In vapor phase contacting, the temperature may range from 300°–700° F., more or less, and the pressure from subatmospheric to atmospheric pressure and supra-atmospheric pressures. Subatmospheric pressures, after the adsorbent has been exposed thereto for a sufficient period of time to empty the pores thereof prior to contacting, are particularly attractive because a lower temperature is required to vaporize the oil to be treated and a more rapid adsorption of the waxy straight chain hydrocarbons is effected. Vapor phase contacting may be advantageously conducted in the presence of a gaseous carrier or diluent to aid in bringing the oil in contact with the adsorbent. Suitable gaseous diluents include $CO_2$, $CO$, $H_2$, $CH_4$, $N_2$ and other naturally gaseous or readily vaporized material.

After adsorption of the waxy straight chain hydrocarbons by the adsorbent and after the adsorbent is partially or fully saturated, the adsorbent must be desorbed of the adsorbed straight chain hydrocarbons in order to be reactivated for the treatment of additional portions of waxy oils. Desorption may be effected by heating the adsorbent to a temperature between 700°–1100° F. Desorption will be appreciably expedited if, in addition to the heating, a stripping gas is passed through the adsorbent to carry off the waxy hydrocarbons as they are desorbed. The aforementioned gaseous diluents may also be employed in the stripping operation. Low and high molecular weight hydrocarbons may also be employed as the description or stripping agent. In this instance, the hydrocarbons should be of non-straight chain configuration so as not to be subject to adsorption by the adsorbent and, additionally, the hydrocarbons should have a boiling point different from the adsorbed waxy hydrocarbons in order to facilitate their subsequent separation.

In a further embodiment of the invention, the dewaxing process described herein may be employed in combination with a conventional dewaxing process. Such a combination of steps is particularly advantageous in the treatment of petroleum portions containing substantial amounts of waxy hydrocarbons, i.e. in the order of 10–20% or more. According to such a combination process, a conventional solvent dewaxing step would be employed to remove most of the waxy hydrocarbons followed by treatment with a solid adsorbent to remove the remaining wax from the treated portion. Such a process would operate to remove substantially all of the wax present in high wax-content petroleum fractions. A conventional solvent dewaxing process for use in the above combination would employ an aliphatic ketone and a low molecular weight aromatic hydrocarbon as the dewaxing solvent. A particularly suitable dewaxing solvent consists of an admixture of methyl ethyl ketone and toluene. In practice, the oil to be treated is dissolved in the dewaxing solvent and the mixture chilled to crystallize the wax. Following crystallization, the wax is removed by physical means such as by filtration or settling out. Following this initial solvent-dewaxing step, the oil is contacted with a solid adsorbent for the adsorption and removal of waxy straight chain hydrocarbons described above. When employing the combination dewaxing process, contact with the solid adsorbent in the second step of such process may be conducted in the presence of the dewaxing solvent employed in the first step. By such a procedure, the dewaxing solvent serves the additional function of a diluent for the oil in the adsorption step, thereby dispensing with the use of added diluents. The dewaxing solvent may, of course, be removed prior to the adsorption step and this latter operation conducted as detailed above.

The drawing is a schematic flow diagram illustrating and setting forth various embodiments of the practice of this invention.

Referring now to the drawing, a fresh feed waxy mineral oil, from a suitable source (not shown) is introduced via line 1 into feed preparation tank 2. The fresh feed in tank 2 is diluted with a low viscosity petroleum solvent, such as benzene or iso-butane, introduced via recycle line 18. The resulting diluted waxy oil is passed via line 3 into heater 4 wherein it is vaporized at between 500°–700° F. and conducted via line 5 into adsorption tower 6, valve 7 being open and valve 9 closed. Adsorption tower 6 contains a porous fixed bed of solid, particle-form selective adsorbent, such as a calcium alumino-silicate (Linde Type 5A Molecular Sieve) maintained at about 400°–600° F., and the heated oil vapors pass in contact with the adsorbent bed to effect adsorption of the waxy straight chain hydrocarbons into the pores of the adsorbent.

The treated oil, now substantially wax free or containing a reduced amount of wax, and accompanying diluent passes out of adsorption tower 6 via line 8 and is conducted via line 12 into distillation tower 13, valve 8a being open and 8b being closed. In distillation tower 13, the oil and solvent are fractionated to recover overhead the relatively low-boiling solvent. The solvent is recovered overhead from tower 13 via line 14, condenser 15 and line 16. More desirably, the recovered solvent is recycled via line 18 for admixture with additional fresh feed waxy oil in feed preparation tank 2. The bottoms from distillation tower 13 consisting of the treated, dewaxed mineral oil, are recovered as finished product via line 19.

Following adsorption of the waxy straight chain hydrocarbons by treatment in adsorber 6 and after a substantial portion of the adsorbent within adsorber 6 has been partially or fully saturated, the prepared and heated waxy mineral oil fresh feed is directed into adsorber 27 to contact fresh adsorbent, valve 7 being closed and valve 9 open. At about the same time, the saturated adsorbent in adsorber 6 is subjected to desorption in order to regenerate the adsorbent and to recover the separated waxy hydrocarbons. Desorption of the waxy hydrocarbons from the adsorbent in adsorber 6 is effected by contact with a relatively hot desorbing agent, such as a hot gas, preferably a gas comprising molecules sufficiently small to penetrate the pores of the adsorbent. Suitable desorption agents include flue gas, methane, hydrogen, nitrogen, carbon dioxide, carbon monoxide, ethane and the like. Higher molecular weight hydrocarbons may also be employed as the desorbing agent. In this case, the hydrocarbon should preferably be of non-straight chain configuration and additionally should boil at a different temperature from the waxes being desorbed. The temperature differential facilitates recovery of the wax and the desorbing agent for recycling. Desorption temperatures range from about 700°–1100° F., more or less.

The desorbing agent is introduced into adsorber 6 via line 22, heater 23, and line 24, valve 24a being open and valve 24b being closed. Steam may also be employed as the desorbing agent followed advantageously by a purge gas such as methane, nitrogen and the like to displace the steam from the pores of the adsorbent prior to contact with additional fresh feed. The desorbed waxy hydrocarbons and accompanying desorption agent are passed from adsorber 6 via lines 25 and 28 into distillation tower 29. In distillation tower 29, the desorbing agent is recovered overhead via line 30, condenser 31 and line 32. If desired, the desorbing agent may be recycled via lines 33 and 24 to adsorber 6 during the above described desorption operation. The bottoms from distillation tower 29 contain the separated waxy hydrocarbons and are recovered as product via line 34.

In the following examples of the invention, the charged mineral oil stock and the treated mineral oil are compared for their solid point and Freon floc point. The solid point test of the oil is conducted by placing a small quantity of oil in a cylindrical flat bottom jar followed by a gradual chilling of the oil. The temperature at which the oil does not flow when the test jar is held in a horizontal position for 5 seconds is taken as the solid point. The Freon floc test is conducted by mixing the oil with "Freon" (dichlorodifluoromethane) in the proportion of about 90% Freon and 10% oil by volume, followed by chilling the mixture and observing the point at which the wax particles coalesce and individual agglomerates appear. The temperature at which these initial agglomerates or flocs are observed in the Freon floc temperature.

EXAMPLE I

A mineral lubricating oil having a Saybolt Universal viscosity of about 80 seconds at 100° F., a solid point of minus 48° F. and a Freon floc point of minus 25° F. was heated under a vacuum to effect vaporization. The vaporized oil was conducted to the bottom of a contact column packed with a calcium aluminosilicate solid adsorbent, Linde Type 5A, maintained at a temperature of 500° F. and which had been maintained at a subatmospheric pressure for a period of time sufficient to empty the pores thereof. The oil vapors passing out of the top of the adsorption column were condensed to the liquid state. On testing, the treated oil was found to have a solid point of minus 71° F. and a Freon floc point of minus 100° F.

A mineral oil fraction similar to that described above was directed in the same manner to an adsorption column filled with a similarly pretreated calcium alumino-silicate solid adsorbent, Linde Type 5A Molecular Sieve maintained at a temperature of 500° F. The treated oil was tested and found to have a Freon floc point of minus 105° F. and a solid point of minus 69° F.

EXAMPLE II

A mineral oil distillate having an SUS viscosity of 80 seconds at 100° F. and a solid point of minus 48° F. was heated in a flash chamber preparatory to dewaxing. Vaporization was effected and the oil passed into an adsorption column filled with an alumino-silicate selective adsorbent, Linde Type 5A Molecular Sieve. Adsorption conditions at the adsorption tower consisted of a temperature of 475–525° F. and a pressure of 0.5 mm. mercury. Following treatment the vapors from the adsorption zone were condensed and the treated oil tested for its solid point. The treated oil exhibited a solid point of minus 74° F., or a lowering of 26° F. in the solid point.

EXAMPLE III

A mineral oil distillate similar to that described in Example II was moderately heated for liquid phase contacting and the heated oil directed to the top of an adsorption column and percolated through a packed bed of an alumino-silicate selective adsorbent, Linde Type 5A Molecular Sieve maintained at 140°–160° F. The treated oil collected at the bottom of the column was tested for its solid point and this was found to be minus 70° F. indicating a substantial improvement over the minus 48° F. of the charge stock.

EXAMPLE IV

A mineral oil distillate having an SUS viscosity of 80 seconds at 100° F. and a solid point of minus 48° F. was heated for liquid phase dewaxing. The heated oil was pumped into an adsorption column for upflow contact with the solid adsorbent. The adsorption column was filled with a calcium alumino-silicate, Linde Type 5A Molecular Sieve, and was maintained at 475°–525° F. The treated oil had a solid point of minus 73° F.

EXAMPLE V

A mineral oil distillate having an SUS viscosity of 300 seconds at 100 F. and a solid point of minus 28° F. was heated for liquid phase dewaxing. The oil was contacted with a calcium alumino-silicate, Linde Type 5A Molecular Sieve, in an adsorption column maintained at about 490° F. After treatment, the oil had a solid point of minus 36° F.

Another portion of the same oil stock was treated with a similar calcium alumino-silicate which was maintained at about 81° F. Tests for the solid point showed no improvement over the charge indicating no dewaxing under low temperature contact conditions.

EXAMPLE VI

A mineral oil distillate having an SUS viscosity of 100 seconds at 100° F. and a solid point of plus 15° F. was heated for liquid phase dewaxing, the oil was contacted with a calcium alumino-silicate, Linde Type 5A Molecular Sieve, in an upflow direction. The adsorption column was maintained at about 500° F. and the velocity of the oil at 1.5 w./hr./w. of adsorbent. After treatment, the oil had a solid point of minus 11° F. showing an improvement of 26° F. in the solid point.

For purposes of simplicity and clarity the conventional control equipment, valves, pumps, heaters, coolers, etc. have for the most part not been illustrated. The location and employment of these auxiliary pieces of equipment and the like, in the practice of this invention are well known.

As will be evident to those skilled in the art, many modifications, substitutions and changes are possible in the practice of this invention without departing from the spirit or scope thereof and such changes are included within the scope of the appended claims.

We claim:

1. In a process for dewaxing a mineral oil mixture in the lubricating oil boiling range containing from about 0.1 to about 5% by weight thereof waxy straight chain hydrocarbons, the steps which comprise heating said oil mixture to effect vaporization, contacting the resulting mixture with an alumino-silicate molecular sieve solid selective adsorbent made up of porous crystals wherein the pores are of molecular dimension and about 5 Angstrom Units sufficiently large to admit straight chain hydrocarbons to the substantial exclusion of non-straight chain hydrocarbons, said adsorbent being characterized by an ability to preferentially adsorb waxy straight chain hydrocarbons to the substantial exclusion of non-straight chain hydrocarbons and having been exposed to a subatmospheric pressure below about 250 mm. Hg prior to the aforesaid contacting operation for a period of time in the range 5 seconds to 2 hours at a temperature above about 200° F. sufficient to empty the pores of said adsorbent, at a temperature between about 500°–700° F. and a pressure below about 250 mm. Hg to adsorb said waxy straight chain hydrocarbons from said mixture, separating said solid adsorbent, now containing waxy hydrocarbons, and recovering the resulting treated mixture now having a reduced wax content.

2. In a process for dewaxing a mineral oil fraction in the lubricating oil boiling range containing waxy straight chain hydrocarbons containing from 18 to 30 carbon atoms per molecule, the steps which comprise admixing said fraction with a dewaxing solvent to form an oil fraction-dewaxing solvent mixture, chilling said mixture to effect wax crystallization, separating the crystallized wax, separating and vaporizing the remaining mixture contacting the resulting vaporized oil contained in said remaining mixture at a temperature within the range of from about 300 to 700° F. and a pressure less than about 250 mm. Hg with a solid alumino-silicate molecular sieve adsorbent made up of porous crystals wherein the pores are of molecular dimension and about 5 Angstrom Units sufficiently large to admit straight chain hydrocarbons to the substantial exclusion of non-straight chain hydrocarbons which adsorbs straight chain hydrocarbons to the substantial exclusion of non-straight chain hydrocarbons to adsorb the waxy straight chain hydrocarbons from said vaporized remaining mixture, said adsorbent having been subjected to a subatmospheric pressure below about 250 mm. Hg prior to the aforesaid contacting operation for a period of time in the range 5 seconds to 2 hours and at a temperature above about 200° F. sufficient to empty the pores of the resulting treated adsorbent, separating said mixture from contact with said adsorbent and separating therefrom a mineral oil fraction having a reduced wax content.

3. A method of dewaxing a vaporized mixture consisting of a mineral oil distillate in the lubricating oil boiling range containing waxy straight chain hydrocarbons which comprises subjecting a solid aluminosilicate molecular sieve selective adsorbent made up of porous crystals wherein the pores are of molecular dimension and about 5 Angstrom Units, sufficiently large to admit straight chain hydrocarbons to the substantial exclusion of non-straight chain hydrocarbons, said adsorbent being characterized by an ability to preferentially adsorb waxy straight chain hydrocarbons, to a subatmospheric pressure below about 250 mm. Hg and an elevated temperature above about 200° F. for a period of time in the range 5 seconds to 2 hours sufficient to substantially completely empty the pores of said adsorbent, subsequently subjecting the thus-treated adsorbent to contact with said mixture at a temperature within the range of from about 300° to about 700° F. and at a pressure below 250 mm. Hg to preferentially adsorb said waxy straight chain hydrocarbons therefrom and recovering the resulting treated mixture now having a reduced waxy straight chain hydrocarbon content.

4. The process for separating waxy straight chain hydrocarbons from a hydrocarbon oil containing the same which comprises: contacting said oil with an aluminosilicate zeolitic solid adsorbent having uniform pores of about 5 A. diameter at a temperature in the range 300–700° F. whereby said waxy straight chain hydrocarbons are adsorbed in said solid adsorbent and withdrawing a substantially dewaxed oil from said solid adsorbent.

5. The process for separating waxy straight chain hydrocarbons from a hydrocarbon oil containing the same which comprises: contacting said oil in vapor phase with an alumino-silicate zeolitic solid adsorbent, having uniform pores of about 5 A. diameter, at a temperature in the range 300–700° F. and a pressure below about 250 mm. Hg, whereby said waxy straight chain hydrocarbons are adsorbed in said solid adsorbent and withdrawing substantially dewaxed oil from said solid adsorbent.

6. A process for separating waxy straight chain hydrocarbons from a hydrocarbon oil containing same which comprises contacting said oil in liquid phase with an alumino-silicate zeolitic solid adsorbent having uniform pores of about 5 Angstrom diameter, at a temperature range of from about 140° F.–700° F. whereby said waxy straight chain hydrocarbons are adsorbed in said solid adsorbent, and withdrawing a substantially dewaxed oil from said solid adsorbent.

7. A process as claimed in claim 6 wherein contacting is carried out at a temperature within the range of from 140 to 525° F.

8. A process as claimed in claim 7 wherein contacting is carried out at a temperature within the range of from 475 to 525° F.

9. An improved process for removal of waxy constituents from a waxy feed oil which comprises passing a stream of said oil to an adsorption zone, contacting said stream in said zone at a temperature from about 140° F. to 700° F. with a crystalline metallic alumino-silicate adsorbent having uniform pore openings of about 5 Angstroms, and withdrawing a substantially dewaxed oil from said zone.

10. An improved process for dewaxing paraffin wax containing oils which comprises slurrying a paraffin wax containing oil with a crystalline metallic alumino-silicate adsorbent having uniform pore openings of about 5 Angstroms, heating and agitating said slurry in a contacting zone at at temperature from about 140° F. to about 700° F., whereby normal waxy paraffins are adsorbed in said adsorbent, separating and recovering a wax-free oil from said zone and regenerating said adsorbent.

11. The process of claim 10 wherein a diluent hydrocarbon having molecules of greater than 5 Angstroms is passed into said contacting zone.

(References on following page)

References Cited by the Examiner

UNITED STATES PATENTS

| | | | |
|---|---|---|---|
| 2,306,610 | 12/1942 | Barrer | 260—676 |
| 2,442,191 | 5/1948 | Black | 260—676 |
| 2,487,804 | 11/1949 | Hermanson | 260—676 |
| 2,574,434 | 11/1951 | Greentree et al. | 260—676 |
| 2,780,358 | 2/1957 | Mosesman et al. | 260—676 |
| 2,786,015 | 3/1957 | Axe | 208—35 |
| 2,818,455 | 12/1957 | Ballard et al. | 260—676 |
| 2,859,256 | 11/1958 | Hess et al. | 260—676 |
| 2,882,243 | 4/1959 | Milton | 260—676 |
| 2,882,244 | 4/1959 | Milton | 260—676 |
| 2,889,893 | 6/1959 | Hess et al. | 260—676 |

OTHER REFERENCES

Selective Adsorption with Zeolites, Chemical and Engineering News, vol. 32, Nov. 29, 1954, page 4786 only.

DELBERT E. GANTZ, *Primary Examiner.*

A. M. BOETTCHER, ALPHONSO D. SULLIVAN, MILTON STERMAN, *Examiners.*

C. W. CRADY, F. M. VAN RIET, H. LEVINE, J. H. HALL, *Assistant Examiners.*